(12) United States Patent
Ponce et al.

(10) Patent No.: US 10,872,019 B2
(45) Date of Patent: Dec. 22, 2020

(54) LOAD AND SAVE RECOVERY PARTITION USING MOBILE DEVICE

(71) Applicant: NCR Corporation, Atlanta, GA (US)

(72) Inventors: James Garzon Ponce, Ibabao-Estancia Mandaue (PH); Eunice Faith Batuhinay Pude, Baclayon (PH); Glenn Paragoso, Talamban (PH); Faith Monteroso Ricabo, Lahug (PH); Mary Jane Sayco, Ebu (PH)

(73) Assignee: NCR Corporation, Atlanta, GA (US)

( * ) Notice: Subject to any disclaimer, the term of this patent is extended or adjusted under 35 U.S.C. 154(b) by 104 days.

(21) Appl. No.: 16/221,463

(22) Filed: Dec. 15, 2018

(65) Prior Publication Data

US 2020/0192761 A1  Jun. 18, 2020

(51) Int. Cl.
*G06F 11/14* (2006.01)
*H04L 29/08* (2006.01)

(52) U.S. Cl.
CPC ...... *G06F 11/1464* (2013.01); *G06F 11/1451* (2013.01); *G06F 11/1469* (2013.01); *H04L 67/34* (2013.01)

(58) Field of Classification Search
CPC ............ G06F 11/1451; G06F 11/1464; G06F 11/1469
See application file for complete search history.

(56) References Cited

U.S. PATENT DOCUMENTS 7,024,581 B1 * 4/2006 Wang ................. G06F 11/1417
713/2

* cited by examiner

*Primary Examiner* — Yong J Choe
(74) *Attorney, Agent, or Firm* — Schwegman, Lundberg & Woessner

(57) ABSTRACT

A computer implemented method includes executing an image recovery app on a mobile device, initiating a recovery partition transfer between the mobile device and a terminal via the image recovery app and a communication connection between the mobile device and the terminal, and transferring the recovery partition between mobile device memory and the terminal to selectively restore the recover partition to the terminal or save the recovery partition to the mobile device memory.

16 Claims, 4 Drawing Sheets

LOAD AND SAVE RECOVERY PARTITION USING MOBILE DEVICE

BACKGROUND

A recovery partition is a portion of a storage device, such as a disk drive on a computer system, referred to as a terminal, that is set aside by the manufacturer to hold an image of the terminal as it was shipped from the factory. Some users wish to have a backup copy of the recovery partition, which includes operating system code and settings that may be used to restore the terminal should the need arise, such as when the storage device fails, or the recovery partition stored thereon becomes damaged. Current mechanisms for storing a backup copy include the use of a networked storage device, a local storage device, or drive via wireless or physical connection to the terminal.

SUMMARY

A computer implemented method includes executing an image recovery app on a mobile device, initiating a recovery partition transfer between the mobile device and a terminal via the image recovery app and a communication connection between the mobile device and the terminal, and transferring the recovery partition between mobile device memory and the terminal to selectively restore the recover partition to the terminal or save the recovery partition to the mobile device memory.

DETAILED DESCRIPTION

Figure 1:
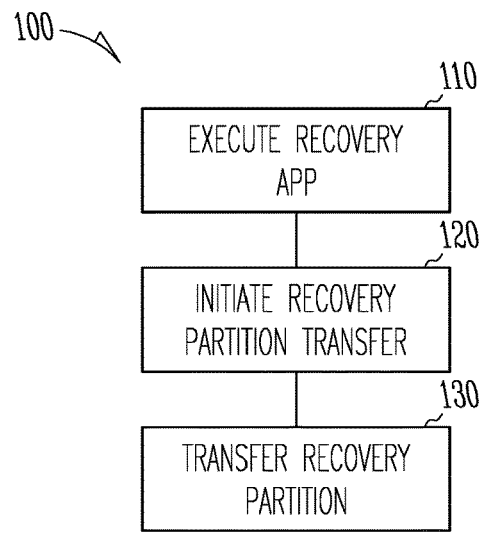
FIG. 1 is a flowchart illustrating a mobile device implemented method for creating a backup or restoring a recovery partition for a terminal according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

To back up a recovery partition of a terminal, such as a personal computer or laptop computer for example, a storage device is used. In the past, a network connection to a server, or a disk drive was utilized for such backup. Sometimes, a network connection is not available, or a user wishes to avoid the cost of a disk drive.

FIG. 1 is a flowchart illustrating a mobile device implemented method 100 for creating a backup or restoring a recovery partition for a terminal. The terminal may be a laptop, desktop, or other computers having an operating system stored in the recovery partition. The recovery partition may include data and code to place the terminal in a state equivalent to an initial factory shipped state. The mobile device may be a mobile phone or other network enabled device commonly used for audible speech based wireless communications.

An image recovery app is executed by the mobile device at operation 110. The image recovery app may provide a user interface for initiating the transfer either to or from the terminal device. If the terminal device is being restored, the app may provide a selection list of recovery partitions stored on the mobile device to allow the user to select the proper recovery partition to transfer. The app may also provide a time remaining indication with a user perceivable notice when a certain amount of time, such as 5 minutes, is remaining for the transfer to complete.

At operation 120, a recovery partition transfer between the mobile device and a terminal is initiated via a communication connection between the mobile device and the terminal is initiated. The communication connection comprises a universal serial bus (USB) connection between the mobile device and the terminal. Various USB connectors, such as USB 3.0, 3.1, C, or other types of data transfer connections may be used. The communication connection may also be a wireless connection between the mobile device and the terminal, such as BLUETOOTH® or WiFi.

At operation 130, the recovery partition is transferred between mobile device memory and the terminal to selectively restore the recover partition to the terminal or save the recovery partition to the mobile device memory. The transfer may be monitored to provide an estimated time for completion to the user.

Figure 2:
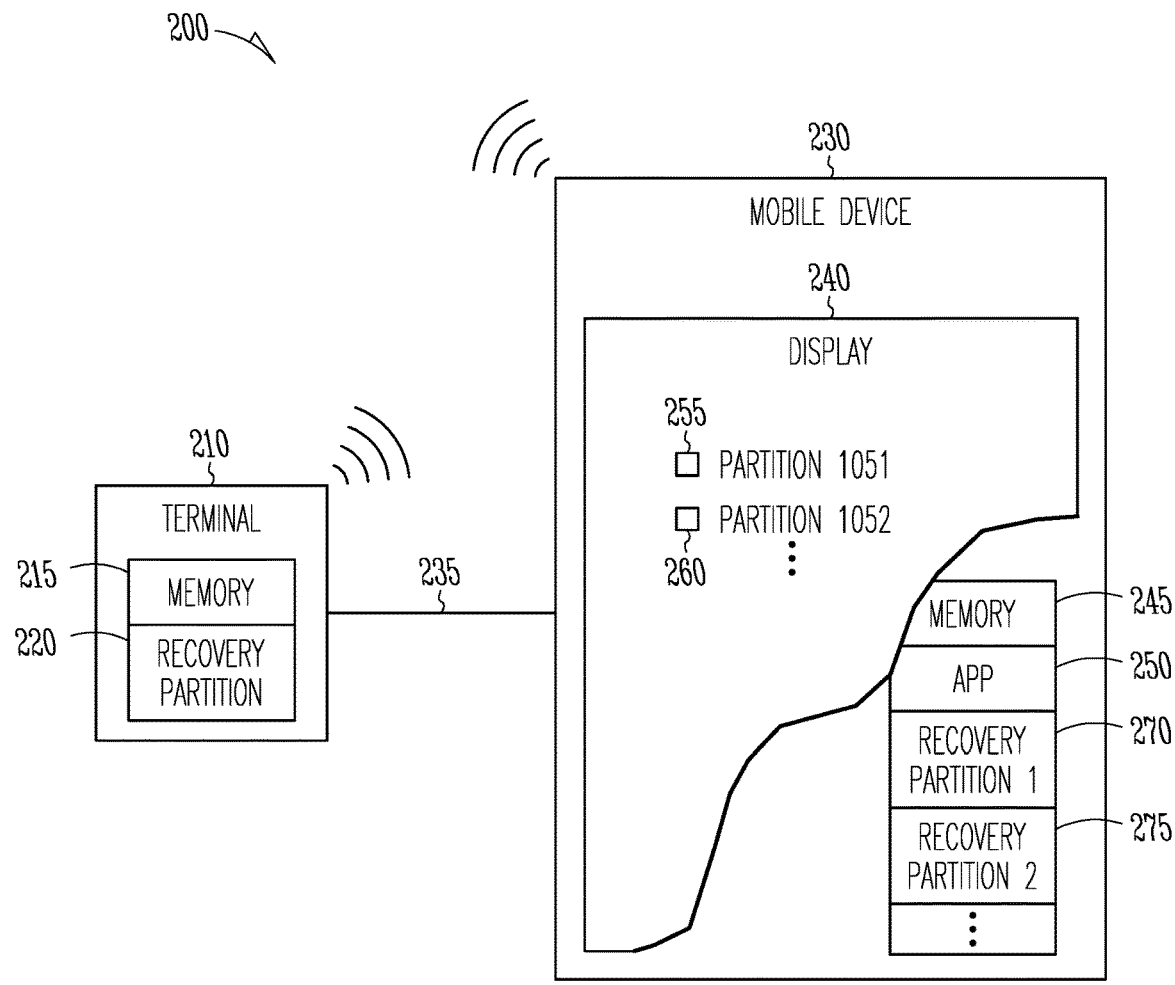
FIG. 2 is a block diagram illustrating components involved in a recovery partition transfer according to an example embodiment.

FIG. 2 is a block diagram 200 illustrating components involved in a recovery partition transfer. A terminal 210 includes a memory device 215 having a recovery partition 220 that comprises of information used to restore the terminal 210 to an initial state. The information is referred to as an image in some examples, and a transfer of the recovery partition 220 includes a transfer of that image. The image includes data and code, such as settings and operation system code. Images for different terminals may be different.

A mobile device 230 is shown coupled to the terminal 210 via a communication connection 235. The communication connection 235 may be a USB type connector, a wireless connection, or any other means of communication between the terminal 210 and mobile device 230. The mobile device 230 includes a display 240, shown in cutaway form to reveal a representation of internal memory 245.

The display 240 shows one user interface generated by an image recovery app 250. The interface illustrated includes a list of images available for transfer from the mobile device 230 to the terminal 210, such as partition/OS1 image at 255 and partition/OS2 image at 260, each having an associated checkbox to facilitate selection by the user. Other selection constructs may be used, such as icons, hyperlinks, or other means of selecting an image for transfer. The corresponding partitions are illustrated in the memory 245 at 270 and 275. Further partitions may be stored in memory 245.

When used to backup an image from terminal 210, the mobile device executes instructions of the app to detect a recovery partition of the terminal 210. The backup may begin automatically via the app or may be initiated via user interaction with the app in further embodiments by selecting a backup function of the app or a prompt upon the app detecting a recovery partition in the terminal 210.

Figure 3:
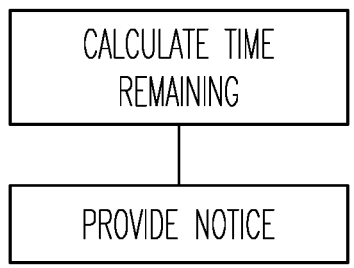
FIG. 3 is a flowchart illustrating a method of providing a time remaining notice for the recovery partition transfer according to an example embodiment.

FIG. 3 is a flowchart illustrating a method 300. At operation 310, a time remaining on the transfer of the recovery partition is calculated. At operation 320, a user perceivable notice is provided in response to the calculated time remaining.

Figure 4:
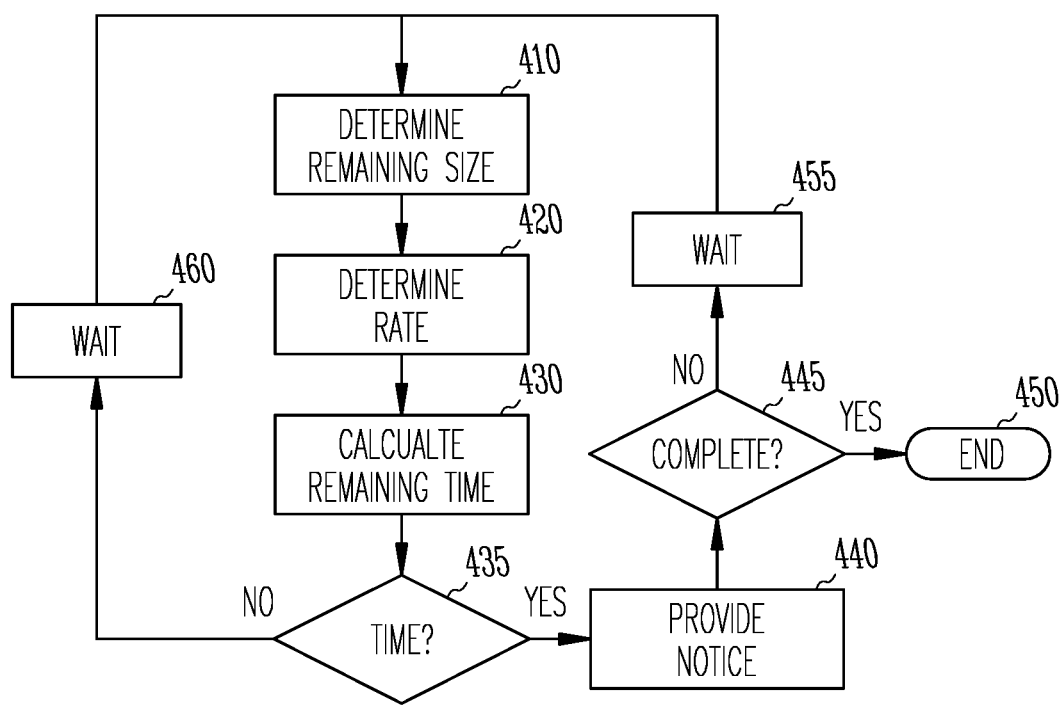
FIG. 4 is a flowchart illustrating a method of periodically calculating the time remaining of a recovery partition transfer according to an example embodiment.

FIG. 4 is a flowchart illustrating a method 400 of periodically calculating the time remaining of a recovery partition transfer. Method 400 includes determining a remaining size of the recovery partition being transferred at operation 410. Such a determination may be performed by the operation system of the mobile device in various embodiments, or other storage management functions. At operation 420, the transfer rate of the recovery partition being transferred is determined. The transfer rate may be an overall average or may be measure of a current rate of transfer in various embodiments. Still other measures may be employed, such as based on previous data transfers utilizing the same communication connection. At operation 430, the time remaining is calculated as a function of the remaining size and the determined transfer rate.

If a decision operation 435, a time threshold has been met, a notice is provided at 440. The time threshold may be set by a user or defaulted to a value. The value in some embodiments may be 5 minutes. In further embodiments any different time may be selected, such as 1, 2, 3, or other number of minutes, seconds, etc. In still further embodiments multiple thresholds may be set, such that a notice is provided at 440 as each threshold is reached by the time remaining.

The notice 440 may include any selected sound, haptic effect, graphic effect, text, email, or any other type of means perceivable by a user. A decision operation 445 check to see if the transfer is complete. If complete, at 450, method 400 ends. A notice may or may not be provided at completion, however, a threshold of zero should be included in decision operation 435 to ensure navigation to decision block 445. At operation 455, a selected amount of time is waited prior to returning to operation 410 to avoid consuming additional resources in computing the parameters at 410, 420, and 430. The selected amount of wait time may be zero if resource utilization is not a concern.

If a time threshold is not met at operation 435, a selected amount of time is waited at operation 460 before continuing the method at 410. In one embodiment, the equivalent of operation 445 may be performed prior to the wait operation 460. In such embodiments, a threshold of zero is not needed in operation 435.

Figure 5:
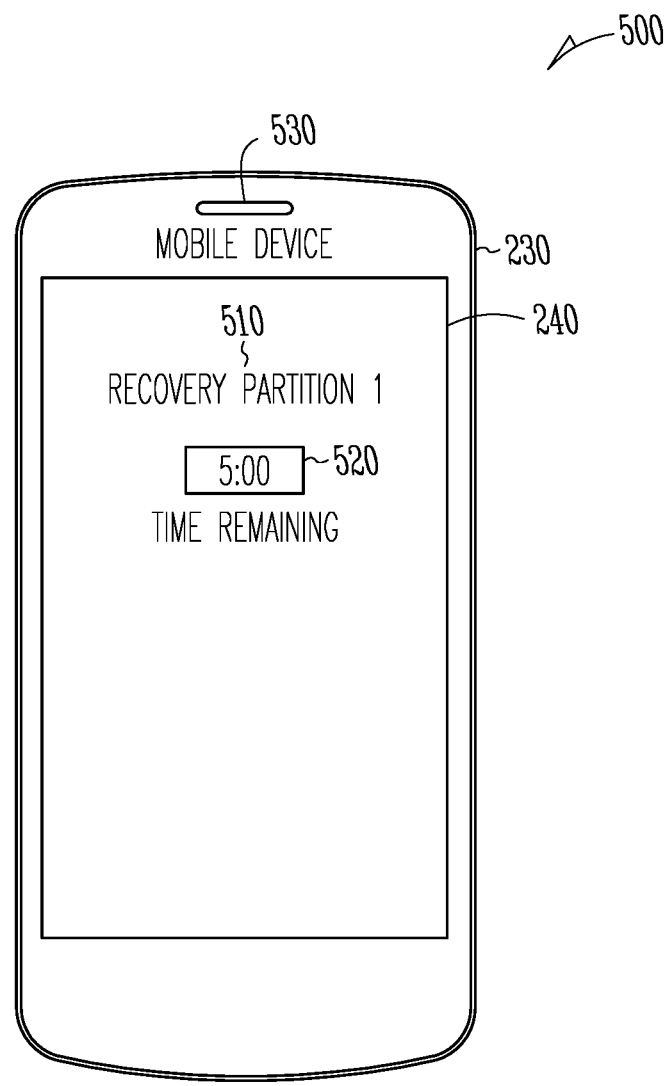
FIG. 5 illustrates a mobile device with display screen showing the progress of a recovery partition transfer according to an example embodiment.

FIG. 5 illustrates a mobile device 230 with display screen 240 showing the progress of a recovery partition transfer generally at 500. An identification of the recovery partition is displayed at 510 along with a time remaining at 520. The time remaining may be periodically updated. As shown, five minutes is remaining in the transfer. This time remaining may correspond to a threshold utilized at operation 435 in FIG. 4, resulting in an audible notice being provided at speaker 530.

Figure 6:
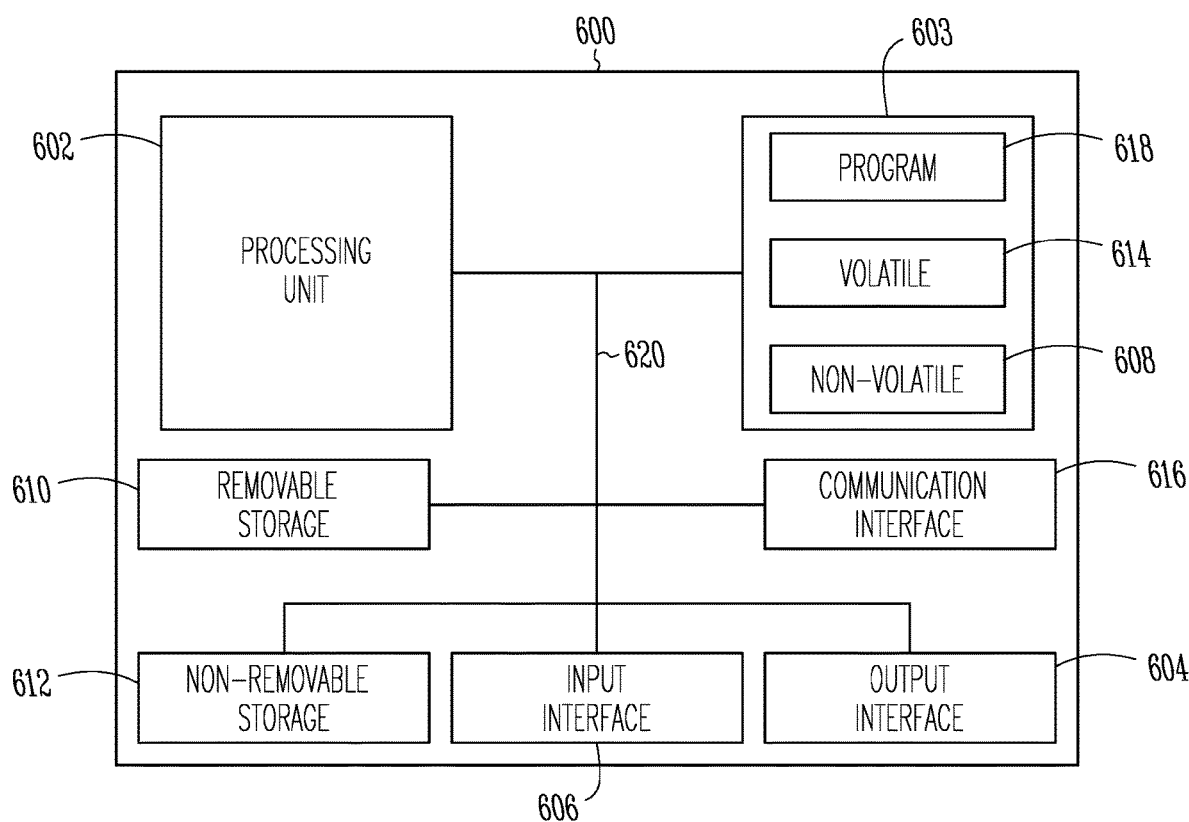
FIG. 6 is a block schematic diagram of a computer system to implement one or more example embodiments.

FIG. 6 is a block schematic diagram of a computer system 600 to execute the recovery partition transfers and storage of recovery partition images and performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment. Computer 600 is also representative of terminals having recovery partitions to be transferred to and from mobile devices.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement the app and other functions, such as storage management functions for transferring data and image recovery operations. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 618 along with the workspace manager 622 may be used to cause processing unit 602 to perform one or more methods or algorithms described herein.

Examples

1. A computer implemented method includes executing an image recovery app on a mobile device, initiating a recovery partition transfer between the mobile device and a terminal via the image recovery app and a communication connection between the mobile device and the terminal, and transferring the recovery partition between mobile device memory and the terminal to selectively restore the recover partition to the terminal or save the recovery partition to the mobile device memory.

2. The method of example 1 wherein the communication connection comprises a universal serial bus (USB) connection between the mobile device and the terminal.

3. The method of any of examples 1-2 wherein the communication connection comprises a wireless connection between the mobile device and the terminal.

4. The method of any of examples 1-3 wherein the terminal comprises a laptop computer having an operating system, and wherein the recovery partition comprises the operating system.

5. The method of example 4 wherein the recovery partition comprises data and code to place the terminal in a state equivalent to an initial factory shipped state.

6. The method of any of examples 1-5 wherein multiple operating systems for the terminal are stored on memory device memory and wherein initiating a recovery partition transfer includes displaying selectable representations of the multiple operating systems and receiving a selection of one of the representations.

7. The method of example 6 wherein transferring the recovery partition comprises transferring the selected operating system from the mobile device memory to the terminal.

8. The method of any of examples 1-7 and further including calculating a time remaining on the transfer of the recovery partition and providing a user perceivable notice in response to the calculated time remaining.

9. The method of example 8 wherein calculating the time remaining includes periodically determining a remaining size of the recovery partition being transferred, determining a transfer rate of the recovery partition being transferred, and calculating the time remaining as a function of the remaining size and transfer rate.

10. The method of example 9 wherein the perceivable notice is provided at a predetermined time remaining prior to completion of the recovery partition transfer.

11. The method of example 9 wherein the perceivable notice is provided upon completion of the recovery partition transfer.

12. A machine-readable storage device has instructions for execution by a processor of a machine to cause the processor to perform operations to perform a method of transferring information. The operations include executing an image recovery app on a mobile device, initiating a recovery partition transfer between the mobile device and a terminal via the image recovery app and a communication connection between the mobile device and the terminal, and transferring the recovery partition between mobile device memory and the terminal to selectively restore the recover partition to the terminal or save the recovery partition to the mobile device memory.

13. The device of example 12 wherein the communication connection comprises a universal serial bus (USB) connection between the mobile device and the terminal.

14. The device of any of examples 12-13 wherein the terminal comprises a laptop computer having an operating system, and wherein the recovery partition comprises the operating system.

15. The device of example 14 wherein the recovery partition comprises data and code to place the terminal in a state equivalent to an initial factory shipped state.

16. The device of any of examples 12-15 wherein multiple operating systems for the terminal are stored on memory device memory and wherein initiating a recovery partition transfer includes displaying selectable representations of the multiple operating systems and receiving a selection of one of the representations.

17. The device of any of examples 12-16 and further including calculating a time remaining on the transfer of the recovery partition and providing a user perceivable notice in response to the calculated time remaining.

18. The device of example 17 wherein calculating the time remaining includes periodically determining a remaining size of the recovery partition being transferred, determining a transfer rate of the recovery partition being transferred, and calculating the time remaining as a function of the remaining size and transfer rate.

19. A device includes a processor, a display coupled to the processor, and a memory device coupled to the processor and having a program stored thereon for execution by the processor to perform operations. The operations include executing an image recovery app on a mobile device, initiating a recovery partition transfer between the mobile device and a terminal via the image recovery app and a communication connection between the mobile device and the terminal, and transferring the recovery partition between mobile device memory and the terminal to selectively restore the recover partition to the terminal or save the recovery partition to the mobile device memory.

20. The device of example 19 wherein multiple operating systems for the terminal are stored on memory device memory and wherein initiating a recovery partition transfer includes displaying selectable representations of the multiple operating systems and receiving a selection of one of the representations, and wherein the operations further include calculating a time remaining on the transfer of the recovery partition and providing a user perceivable notice in response to the calculated time remaining.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
executing an image recovery app on a mobile device;
initiating a recovery partition transfer between the mobile device and a terminal via the image recovery app and a communication connection between the mobile device and the terminal;
transferring the recovery partition between mobile device memory and the terminal to selectively restore the recovery partition to the terminal or save the recovery partition to the mobile device memory;
calculating a time remaining on the transfer of the recovery partition, wherein calculating the time remaining comprises periodically:
determining a remaining size of the recovery partition being transferred;
determining a transfer rate of the recovery partition being transferred; and
calculating the time remaining as a function of the remaining size and transfer rate; and
providing a user perceivable notice in response to the calculated time remaining.

2. The method of claim 1 wherein the communication connection comprises a universal serial bus (USB) connection between the mobile device and the terminal.

3. The method of claim 1 wherein the communication connection comprises a wireless connection between the mobile device and the terminal.

4. The method of claim 1 wherein the terminal comprises a laptop computer having an operating system, and wherein the recovery partition comprises the operating system.

5. The method of claim 4 wherein the recovery partition comprises data and code to place the terminal in a state equivalent to an initial factory shipped state.

6. The method of claim 1 wherein multiple operating systems for the terminal are stored on device memory and wherein initiating a recovery partition transfer comprises:
displaying selectable representations of the multiple operating systems; and
receiving a selection of one of the representations.

7. The method of claim 6 wherein transferring the recovery partition comprises transferring the selected operating system from the mobile device memory to the terminal.

8. The method of claim 1 wherein the perceivable notice is provided at a predetermined time remaining prior to completion of the recovery partition transfer.

9. The method of claim 1 wherein the perceivable notice is provided upon completion of the recovery partition transfer.

10. A machine-readable storage device having instructions for execution by a processor of a machine to cause the processor to perform operations to perform a method of transferring information, the operations comprising:
executing an image recovery app on a mobile device;
initiating a recovery partition transfer between the mobile device and a terminal via the image recovery app and a communication connection between the mobile device and the terminal;
transferring the recovery partition between mobile device memory and the terminal to selectively restore the recovery partition to the terminal or save the recovery partition to the mobile device memory;
calculating a time remaining on the transfer of the recovery partition, wherein calculating the time remaining comprises periodically:
determining a remaining size of the recovery partition being transferred;
determining a transfer rate of the recovery partition being transferred; and
calculating the time remaining as a function of the remaining size and transfer rate; and
providing a user perceivable notice in response to the calculated time remaining.

11. The device of claim 10 wherein the communication connection comprises a universal serial bus (USB) connection between the mobile device and the terminal.

12. The device of claim 10 wherein the terminal comprises a laptop computer having an operating system, and wherein the recovery partition comprises the operating system.

13. The device of claim 12 wherein the recovery partition comprises data and code to place the terminal in a state equivalent to an initial factory shipped state.

14. The device of claim 10 wherein multiple operating systems for the terminal are stored on device memory and wherein initiating a recovery partition transfer comprises:
   displaying selectable representations of the multiple operating systems; and
   receiving a selection of one of the representations.

15. A device comprising:
   a processor;
   a display coupled to the processor; and
   a memory device coupled to the processor and having a program stored thereon for execution by the processor to perform operations comprising:
      executing an image recovery app on a mobile device;
      initiating a recovery partition transfer between the mobile device and a terminal via the image recovery app and a communication connection between the mobile device and the terminal;
      transferring the recovery partition between mobile device memory and the terminal to selectively restore the recovery partition to the terminal or save the recovery partition to the mobile device memory, wherein initiating a recovery partition transfer comprises:
         calculating a time remaining on the transfer of the recovery partition; and
         providing a user perceivable notice in response to the calculated time remaining.

16. The device of claim 15 wherein multiple operating systems for the terminal are stored on memory device memory and wherein initiating a recovery partition transfer comprises:
   displaying selectable representations of the multiple operating systems; and
   receiving a selection of one of the representations.

* * * * *